United States Patent
Spyker (10) Patent No.: US 9,582,371 B1
(45) Date of Patent: Feb. 28, 2017

(54) BALANCING LATENCY AND CONSISTENCY REQUIREMENTS DURING DATA REPLICATION

(71) Applicant: International Business Machines Corporation, Armonk, NY (US)

(72) Inventor: James D. Spyker, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/963,565

(22) Filed: Dec. 9, 2015

(51) Int. Cl.
*G06F 7/04* (2006.01)
*G06F 17/30* (2006.01)
*G06F 11/14* (2006.01)
*H04L 12/911* (2013.01)

(52) U.S. Cl.
CPC .... *G06F 11/1456* (2013.01); *G06F 17/30371* (2013.01); *G06F 17/30575* (2013.01); *G06F 17/30581* (2013.01); *H04L 47/728* (2013.01)

(58) Field of Classification Search
None
See application file for complete search history.

(56) References Cited

U.S. PATENT DOCUMENTS

| | | | |
|---|---|---|---|
| 6,614,781 B1 | 9/2003 | Elliott et al. | |
| 7,564,840 B2 | 7/2009 | Elliott et al. | |
| 8,036,214 B2 | 10/2011 | Elliott et al. | |
| 8,085,761 B2 | 12/2011 | Elliott et al. | |
| 8,089,958 B2 | 1/2012 | Elliott et al. | |
| 8,270,421 B2 | 9/2012 | Elliott et al. | |
| 8,290,909 B2 | 10/2012 | Dettinger et al. | |
| 8,468,132 B1 | 6/2013 | O'Neill et al. | |
| 8,620,862 B2 | 12/2013 | Holenstein et al. | |
| 8,693,347 B2 | 4/2014 | Elliott et al. | |
| 8,775,549 B1 * | 7/2014 | Taylor | H04L 67/1097 707/609 |

(Continued)

FOREIGN PATENT DOCUMENTS

| | | |
|---|---|---|
| EP | 2317710 A2 | 5/2011 |
| EP | 2317711 A1 | 5/2011 |
| EP | 1131926 B1 | 9/2014 |

OTHER PUBLICATIONS

Bailis et al.; "Probabilistically Bounded Staleness for Practical Partial Quorums"; Proceedings of the VLDB Endowment; vol. 5, No. 8; Copyright © 2012, VLDB Endowment; pp. 776-787.

(Continued)

*Primary Examiner* — Bruce Moser
(74) *Attorney, Agent, or Firm* — Edward J. Wixted, III (57) ABSTRACT

In an approach for balancing latency and consistency requirements during data replication, a processor defines a set of strategies representative of different types of inconsistencies between a first database and a second database, wherein the different types of inconsistencies vary with respect to details of a particular replication technology. A processor specifies a latency threshold at which a first type of inconsistency is allowed, based on user input of business information to enhance business value, wherein the type of inconsistency is selected from the set of strategies. A processor determines that a requested replication crosses the latency threshold. A processor pushes data into a target database, wherein latency is dynamically balanced with data consistency, based on the latency threshold.

20 Claims, 3 Drawing Sheets

(56) References Cited

U.S. PATENT DOCUMENTS

2014/0095813 A1    4/2014   Shukla et al.
2015/0074052 A1    3/2015   Srinivasan et al.
2015/0278331 A1*  10/2015   Blea .................. G06F 17/30575
                                                                707/610

OTHER PUBLICATIONS

Campos et al.; "HBase++: Extending HBase With Client-Centric Consistency Guarantees for Geo-Replication"; 11 pages; Presented at INForum on Sep. 5, 2014.
Tiwari et al.; "Issues in Replicated data for Distributed Real-Time Database Systems"; IJCSIT, International Journal of Computer Science and Information Technologies; vol. 2 (4), 2011, 1364-1371.
Wei et al.; "ORDER: A Dynamic Replication Algorithm for Periodic Transactions in Distributed Real-Time Databases"; 10th International Conference on Real-Time and Embedded Computing Systems and Applications (RTCSA 2004); Aug. 2004; 18 pages.
Zhu et al.; "Latency Bounding by Trading off Consistency in NoSQL Store: A Staging and Stepwise Approach"; arXiv:1212.1046v1 [cs.DB] Dec. 5, 2012; 18 pages.
"Distributed Data Management with VMware vFabric GemFire"; VMware; Technical White Paper; Copyright © 2010, VMware, Inc.; pp. 1-19.

* cited by examiner

BALANCING LATENCY AND CONSISTENCY REQUIREMENTS DURING DATA REPLICATION

BACKGROUND

The present invention relates generally to the field of data replication, and more particularly to balancing latency and consistency requirements during data replication.

Replication in computing involves sharing information so as to ensure consistency between redundant resources, such as software or hardware components, to improve reliability, fault-tolerance, or accessibility.

Database replication is the frequent electronic copying of data from a database in one computer or server to a database in another computer or server so that all users share the same level of information. The result is a distributed database in which users can access data relevant to tasks without interfering with the work of others. Database replication can be used on many database management systems, usually with a master/target relationship between the original and the replicas. The master database logs the updates, which then ripple through to the target databases. The target database outputs a message stating that the target database has received the update successfully, thus allowing the sending (and potentially resending until successfully applied) of subsequent updates.

SUMMARY

Aspects of an embodiment of the present invention disclose a method, computer program product, and computing system for balancing latency and consistency requirements during data replication. A processor defines a set of strategies representative of different types of inconsistencies between a first database and a second database, wherein the different types of inconsistencies vary with respect to details of a particular replication technology. A processor specifies a latency threshold at which a first type of inconsistency is allowed, based on user input of business information to enhance business value, wherein the type of inconsistency is selected from the set of strategies. A processor determines that a requested replication crosses the latency threshold. A processor pushes data into a target database, wherein latency is dynamically balanced with data consistency, based on the latency threshold.

DETAILED DESCRIPTION

Embodiments of the present invention recognize that with the current state of data replication, one of the challenges is to balance the competing requirements of maintaining low latency and maintaining consistency. These are competing requirements because breaking the consistency requirement can allow data replication to apply data more quickly from the source to the target, reducing latency.

Embodiments of the present invention propose an efficient solution to allow a user to indicate the relative business costs between inconsistency and increased latency, allowing the data replication technology to minimize the overall cost to the user.

Embodiments of the present invention will now be described in detail with reference to the Figures.

Figure 1:
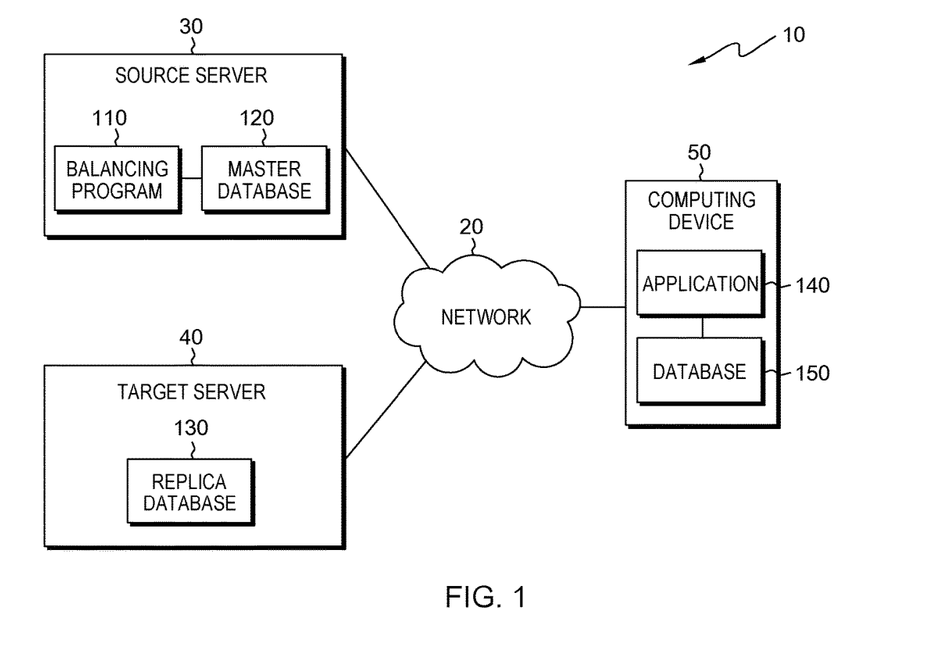
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes source server 30, target server 40, and computing device 50 interconnected over network 20. Network 20 may be a local area network (LAN), a wide area network (WAN) such as the Internet, a cellular data network, any combination thereof, or any combination of connections and protocols that will support communications between source server 30, target server 40, and computing device 50, in accordance with embodiments of the invention. Network 20 may include wired, wireless, or fiber optic connections. Computing system 10 may include additional computing devices, servers, or other devices not shown.

Source server 30 may be a management server, a web server, or any other electronic device or computing system capable of processing program instructions and receiving and sending data. In some embodiments, source server 30 may be a laptop computer, tablet computer, netbook computer, personal computer (PC), a desktop computer, or any programmable electronic device capable of communicating with target server 40 and computing device 50 via network 20. In other embodiments, source server 30 may represent a server computing system utilizing multiple computers as a server system, such as in a cloud computing environment. In another embodiment, source server 30 represents a computing system utilizing clustered computers and components to act as a single pool of seamless resources. In the depicted embodiment, source server 30 contains balancing program 110 and master database 120. In other embodiments, source server 30 may include other components, as depicted and described in further detail with respect to FIG. 3.

Target server 40 may be a management server, a web server, or any other electronic device or computing system capable of processing program instructions and receiving and sending data. In some embodiments, target server 40 may be a laptop computer, tablet computer, netbook computer, personal computer (PC), a desktop computer, or any programmable electronic device capable of communicating with source server 30 and computing device 50 via network 20. In other embodiments, target server 40 may represent a server computing system utilizing multiple computers as a server system, such as in a cloud computing environment. In another embodiment, target server 40 represents a computing system utilizing clustered computers and components to act as a single pool of seamless resources. In the depicted embodiment, target server 40 contains replica database 130. In other embodiments, target server 40 may include other components, as depicted and described in further detail with respect to FIG. 3.

Computing device 50 may be a desktop computer, laptop computer, netbook computer, or tablet computer. In general, computing device 50 may be any electronic device or computing system capable of processing program instructions, sending and receiving data, and communicating with source server 30 and target server 40 via network 20. In the depicted embodiment, computing device 50 contains application 140 and database 150. In other embodiments, computing device 50 may include other components, as depicted and described in further detail with respect to FIG. 3.

Balancing program 110 balances latency and consistency requirements during data replication. In doing so, balancing program 110 defines a set of strategies. Balancing program 110 specifies a latency threshold. Balancing program 110 determines the latency threshold is crossed. Balancing program 110 determines the requested replication is permitted to make choices. Balancing program 110 pushes data into a target database. In the depicted embodiment, balancing program 110 resides on source server 30. In other embodiments, balancing program 110 may reside on another server or another computing device, provided that balancing program 110 can access master database 120, replica database 130, application 140, and database 150 via network 20.

Master database 120 may be a repository that may be written to and/or read by balancing program 110. In some embodiments, a program (not shown) may allow an administrator or other user to define a latency threshold and store the latency threshold to master database 120. For example, the latency threshold may be a maximum allowed latency for data being transferred from one database to another database. In other embodiments, master database 120 may store already determined latency thresholds. In some embodiments, master database 120 may be the source of a large transaction, where the transaction is a transfer of data and master database 120 is a source of the data of the transaction to replica database 130. In the depicted embodiment, master database 120 resides on source server 30. In other embodiments, master database 120 may reside on another server or another computing device, provided that master database 120 is accessible to balancing program 110 via network 20.

Replica database 130 may be a repository that may be written to and/or read by balancing program 110. In some embodiments, a program (not shown) may allow an administrator or other user to define a latency threshold and store the latency threshold to replica database 130. In other embodiments, replica database 130 may store already determined latency thresholds. In some embodiments, replica database 130 may be the target of a large transaction. In the depicted embodiment, replica database 130 resides on target server 40. In other embodiments, replica database 130 may reside on another server or another computing device, provided that replica database 130 is accessible to balancing program 110 and master database 120 via network 20.

Application 140 may be any application or program on computing device 50 that may be accessed by balancing program 110 over network 20. For example, application 140 may be an application or program designed to allow a user to request a transaction. Balancing program 110 may use a user's requested transaction from application 140 to replicate data to various destinations for other users who may be using application 140 on another computing device. In the depicted embodiment, application 140 resides on computing device 50. In other embodiments, application 140 may reside on another computing device or another server, provided that application 140 is accessible to balancing program 110 via network 20.

Database 150 may be a repository that may be written to and/or read by balancing program 110 and application 140. In some embodiments, a program (not shown) may allow an administrator or other user to define a latency threshold and store the latency threshold to database 150. In other embodiments, database 150 may store already determined latency thresholds. In some embodiments, database 130 may be the source or target of a large transaction. In the depicted embodiment, database 150 resides on computing device 50. In other embodiments, database 150 may reside on another computing device or another server, provided that database 150 is accessible to balancing program 110, master database 120, and application 140 via network 20.

Figure 2:
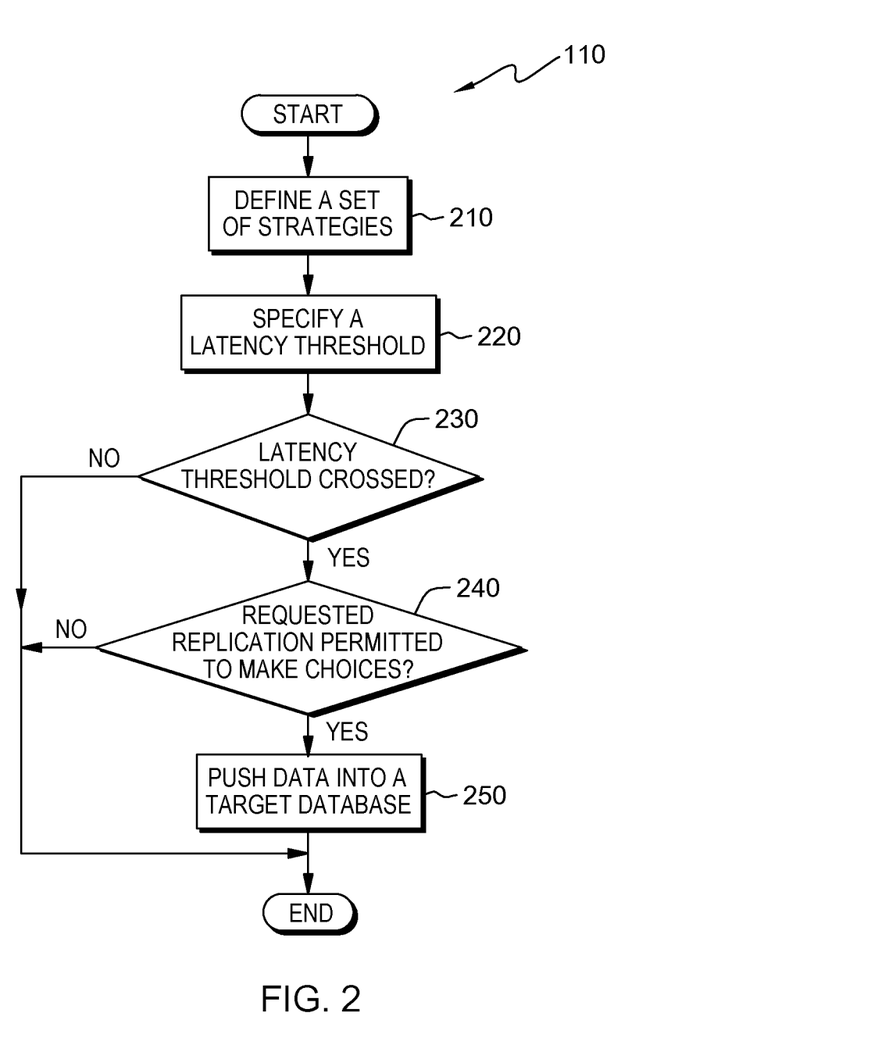
FIG. 2 depicts a flowchart of the steps of a balancing program, executing within the computing system of FIG. 1, for balancing latency and consistency requirements during data replication, in accordance with an embodiment of the present invention.

FIG. 2 depicts a flowchart of the steps of a balancing program, executing within the computing system of FIG. 1, in accordance with an embodiment of the present invention. Balancing program 110 balances latency and consistency requirements during data replication.

In step 210, balancing program 110 defines a set of strategies. The strategies refer to types of inconsistencies between the multiple databases. Examples of strategies include, but are not limited to: source side transactions are committed out of order; source side operations are applied out of order, although commit points are maintained; separate tables (or groups of tables) are applied by different database connections with some level of coordination between the connections to keep the target fairly consistent between all tables; and large source side transactions will be applied as several smaller transactions on the target. In one embodiment, balancing program 110 defines a set of strategies that vary, depending on the details of the replication technology. In other embodiments, balancing program 110 defines a set of strategies, where only a subset of the strategies are allowed at a particular point in time. In some embodiments, balancing program 110 defines a "no holds barred" set of strategies, where replication can do whatever is necessary to get the data into the target database as efficiently as possible.

In step 220, balancing program 110 specifies a latency threshold. The latency threshold is based on user specified business information that allows the underlying technology to select between various strategies as appropriate to enhance business value. In one embodiment, balancing program 110 specifies one latency threshold to be applied for all transactions. In other embodiments, balancing program 110 specifies multiple latency thresholds to be applied intermittently during a transaction. In some embodiments, balancing program 110 specifies multiple latency thresholds to be applied during various types of transactions. Still, in other embodiments, receives a latency threshold from a user. For example, if the user indicates that if replication becomes one minute latent, balancing program 110 allows the replication technology to apply operations out of order, if it is known that the business cost of one minute of latency is equivalent to, or greater than, the business cost of having operations applied out of order. Additionally, the user may indicate that at two minutes of latency it is acceptable to have imperfect consistency between the databases.

In one embodiment, there is an absolute limit of latency at which the business value of the target database essentially drops to zero. When the target database is used for analytics, there may be a latency threshold at which the business would redirect the analytics for the target system back to the source system. Generally, a user is very cautious about allowing any type of inconsistency, as inconsistencies can have significant impact on the business value of the target database. By allowing the user to specify a latency threshold for a type of inconsistency, the user is able to ensure that balancing program 110 maintains a target database that enhances business value to the user, knowing that any inconsistency exists only for the benefit of reduced latency. In other embodiments, the user ranks the strategies via balancing program 110, indicating the order in which the replication technology should take advantage of the strategies at a particular latency threshold.

In decision 230, balancing program 110 determines whether the latency threshold is crossed. In one embodiment, a requested replication of data from master database 120 to replica database 130 is submitted through application 140. Balancing program 110 makes the determination by comparing the time of replication of the requested replication into replica database 130 to the specified latency threshold. If balancing program 110 determines that the latency threshold is not crossed (decision 230, no branch), balancing program 110 ends. If balancing program 110 determines that the latency threshold is crossed (decision 230, yes branch), balancing program 110 determines whether the requested replication is permitted to make choices (decision 240). Balancing program 110 makes the determination based on predictions of future content of a transaction, where the replication adjusts strategies as necessary when predictions are inaccurate. If balancing program 110 determines that the requested replication is not permitted to make choices (decision 240, no branch), in one embodiment, balancing program 110 ends. In other embodiments, if balancing program 110 determines that the requested replication is not permitted to make choices (decision 240, no branch), balancing program 110 pushes data into a target database, using one or more specified strategies for this particular situation (not shown). If balancing program 110 determines that the requested replication is permitted to make choices (decision 240, yes branch), balancing program 110 pushes data into a target database (step 250).

In step 250, balancing program 110 pushes data into a target database. In one embodiment, balancing program 110 pushes data from master database 120 into one target database, such as replica database 130. In some embodiments, balancing program 110 pushes data from master database 120 into multiple target databases, such as replica database 130 and database 150.

In one embodiment, after balancing program 110 determines that applying the source transaction "perfectly" would cause the replication to cross the latency threshold, then balancing program 110 is free to use any strategy possible to push the data into the target database (i.e., no holds barred approach). Large transactions are often the result of a single source table and a sequence of insert operations. Since the operations are not dependent, many database connections can be made into the target database. The operations can be "round robined" between the database connections. If at some point other operations (e.g., updates) appear, then dependencies between the operations can now exist and the general "round robin" approach may be changed. When operating in a no holds barred mode, the database connections can be committed and a new strategy (e.g., separating operations by table across multiple connections) may be applied. Balancing program 110 can make choices based on predictions of the future content of the transaction, because balancing program 110 can adjust strategies, as necessary, if the predictions are determined to be inaccurate.

In other embodiments, when the load pattern consists of many smaller transactions and latency crosses a threshold so that one or more inconsistency options are now available, then balancing program 110 can begin to experiment with fast apply algorithms (i.e., algorithms that are appropriate for varying replication needs) that may create the, now, allowed inconsistencies. There are, at least, two different strategies to select the algorithm of which to make use.

In a first strategy, balancing program 110 provides a scoring function for each algorithm that indicates a benefit, based on a set of statistics about the source workload. The replication technology maintains the statistics on a sliding window of recent source workloads, and then relies on the scoring function to identify the best algorithm. Balancing program 110 would rerun the scoring function at regular intervals to adjust to changes in the workload. The first strategy may require that each algorithm provide such a scoring function, including an indication of the specific statistics required, and then that the replication technology maintain a superset of statistics that include the union of the required statistics from each available algorithm.

In a second strategy, balancing program 110 tries each of the available algorithms for a short period of time, recording general statistics about the rate of replication that the algorithm is able to provide. Balancing program 110 would, then, begin to use the algorithm that provided the best rate of replication. If latency remains above the threshold for a significant period of time, then balancing program 110 could retry each of the available algorithms again to determine whether the source load pattern has changed, making a different algorithm the best choice for the current workload.

There should be very little cost in moving between various algorithms, including moving between a fast apply algorithm and the standard algorithm that maintains complete consistency. The user can add an upper and lower bound to the threshold to minimize the switching, back and forth, between fast apply algorithms and standard algorithms if it is determined that the cost of switching, back and forth, is large enough. Replication would switch to the fast apply algorithm when latency crossed above the upper bound, but only switch back to the standard algorithm when latency crossed below the lower bound.

In one embodiment (not shown), there are two components of the replication technology (program): a balancing function and an apply function. The apply function of the replication technology provides information about the latency, and the balancing function provides the information about the strategies that the apply function is able to use at the current time.

Figure 3:
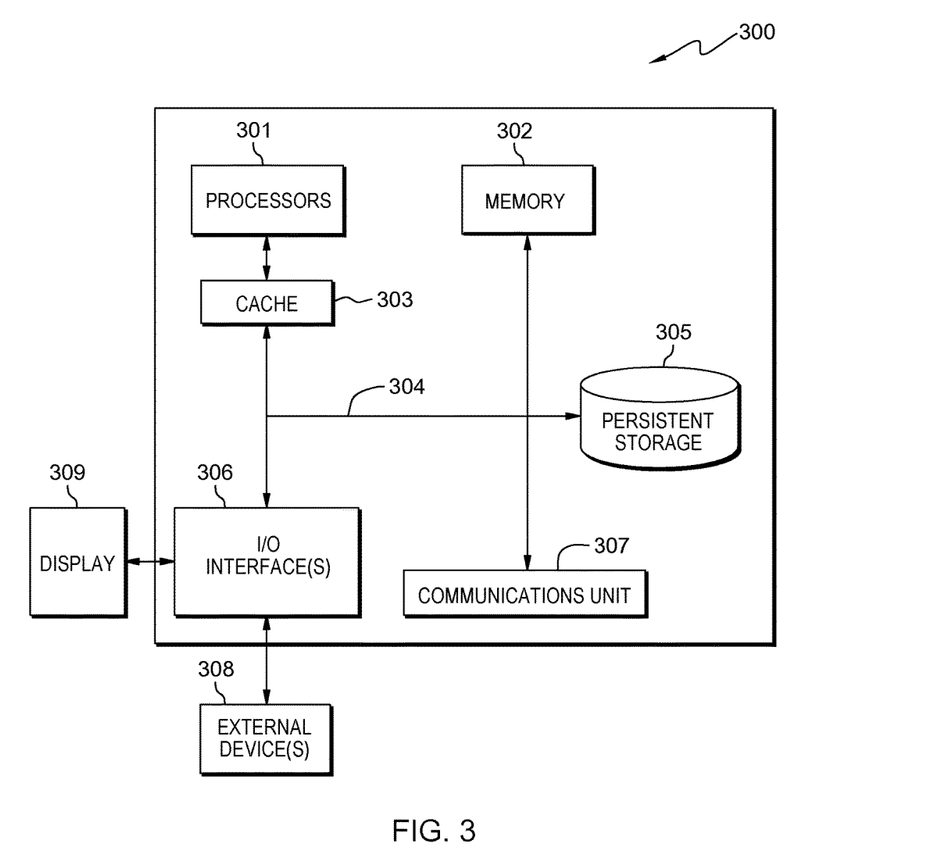
FIG. 3 depicts a block diagram of components of the servers and/or the computing device of FIG. 1, in accordance with an embodiment of the present invention.

FIG. 3 depicts computer system 300, which is an example of a system, such as source server 30, target server 40 and/or computing device 50. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307. Balancing program 110 and master database 120 may be downloaded to persistent storage 305 of source server 30 through communications unit 307 of source server 30. Replica database 130 may be downloaded to persistent storage 305 of target server 40 through communications unit 307 of target server 40. Application 140 and database 150 may be downloaded to persistent storage 305 of computing device 50 through communications unit 307 of computing device 50.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., balancing program 110 and master database 120, can be stored on such portable computer readable storage media and can be loaded onto persistent storage 305 of source server 30 via I/O interface(s) 306 of source server 30. Software and data used to practice embodiments of the present invention, e.g., replica database 130, can be stored on such portable computer readable storage media and can be loaded onto persistent storage 305 of target server 40 via I/O interface(s) 306 of target server 40. Software and data used to practice embodiments of the present invention, e.g., application 140 and database 150, can be stored on such portable computer readable storage media and can be loaded onto persistent storage 305 of computing device 50 via I/O interface(s) 306 of computing device 50. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for balancing latency and consistency requirements during data replication, the method comprising:
    defining, by one or more processors, a set of strategies representative of different types of inconsistencies between a first database and a second database, wherein the different types of inconsistencies vary with respect to details of a particular replication technology;
    specifying, by one or more processors, a latency threshold at which a first type of inconsistency is allowed, based on a user input of a cost related to the latency threshold, wherein the type of inconsistency is selected from the set of strategies;
    determining, by one or more processors, that a requested replication exceeds the latency threshold; and
    moving, by one or more processors, data into a target database, wherein latency is dynamically balanced with data consistency, based on testing an algorithm from a set of algorithms, recording statistics that the algorithm provides about a rate of replication, determining the algorithm provides a best rate of replication, and using the algorithm to move the data into the target database, wherein the algorithm is retested if latency remains above the latency threshold.

2. The method of claim 1, further comprising:
    in response to determining that the requested replication crossed the latency threshold, determining, by one or more processors, that the requested replication is permitted to make choices in regard to a strategy to use, based on predictions of future content of a transaction, wherein the requested replication adjusts the strategy as necessary when predictions are inaccurate.

3. The method of claim 1, wherein moving the data into the target database comprises:
    moving, by one or more processors, the data into the target database, based on providing a scoring function for an algorithm that indicates a benefit of using the algorithm, based on a set of statistics about a source workload.

4. The method of claim 1, wherein moving the data into the target database comprises:
    moving, by one or more processors, the data into the target database, based on the latency threshold, wherein the target database is an analytics database and analytics for the target database are redirected back to a source database.

5. The method of claim 1, further comprising:
    in response to determining that the requested replication crossed the latency threshold, using, by one or more processors, algorithms that create an allowed type of inconsistency.

6. The method of claim 1, wherein the set of strategies include source side transactions are committed out of order; source side operations are applied out of order, although commit points are maintained; separate tables are applied by different database connections with some level of coordination between the database connections to keep the target database consistent between all tables; and source side transactions are applied as transactions on the target database.

7. The method of claim 1, wherein the latency threshold comprises an upper bound and a lower bound.

8. A computer program product for balancing latency and consistency requirements during data replication, the computer program product comprising:
- one or more computer readable storage media and program instructions stored on the one or more computer readable storage media, the program instructions comprising:
- program instructions to define a set of strategies representative of different types of inconsistencies between a first database and a second database, wherein the different types of inconsistencies vary with respect to details of a particular replication technology;
- program instructions to specify a latency threshold at which a first type of inconsistency is allowed, based on a user input of a cost related to the latency threshold, wherein the type of inconsistency is selected from the set of strategies;
- program instructions to determine that a requested replication exceeds the latency threshold; and
- program instructions to push data into a target database, wherein latency is dynamically balanced with data consistency, based on testing an algorithm from a set of algorithms, recording statistics that the algorithm provides about a rate of replication, determining the algorithm provides a best rate of replication, and using the algorithm to move the data into the target database, wherein the algorithm is retested if latency remains above the latency threshold.

9. The computer program product of claim 8, further comprising:
- in response to determining that the requested replication crossed the latency threshold, program instructions, stored on the one or more computer readable storage media, to determine that the requested replication is permitted to make choices in regard to a strategy to use, based on predictions of future content of a transaction, wherein the requested replication adjusts the strategy as necessary when predictions are inaccurate.

10. The computer program product of claim 8, wherein program instructions to move the data into the target database comprise:
- program instructions to move the data into the target database, based on providing a scoring function for an algorithm that indicates a benefit of using the algorithm, based on a set of statistics about a source workload.

11. The computer program product of claim 8, wherein program instructions to wherein program instructions to move the data into the target database comprise:
- program instructions to move the data into the target database, based on the latency threshold, wherein the target database is an analytics database and analytics for the target database are redirected back to a source database.

12. The computer program product of claim 8, further comprising:
- in response to determining that the requested replication crossed the latency threshold, program instructions, stored on the one or more computer readable storage media, to use algorithms that create an allowed type of inconsistency.

13. The computer program product of claim 8, wherein the set of strategies include source side transactions are committed out of order; source side operations are applied out of order, although commit points are maintained; separate tables are applied by different database connections with some level of coordination between the database connections to keep the target database consistent between all tables; and source side transactions are applied as transactions on the target database.

14. The computer program product of claim 8, wherein the latency threshold comprises an upper bound and a lower bound.

15. A computer system for balancing latency and consistency requirements during data replication, the computer system comprising:
- one or more computer processors, one or more computer readable storage media, and program instructions stored on the computer readable storage media for execution by at least one of the one or more processors, the program instructions comprising:
- program instructions to define a set of strategies representative of different types of inconsistencies between a first database and a second database, wherein the different types of inconsistencies vary with respect to details of a particular replication technology;
- program instructions to specify a latency threshold at which a first type of inconsistency is allowed, based on a user input of a cost related to the latency threshold, wherein the type of inconsistency is selected from the set of strategies;
- program instructions to determine that a requested replication exceeds the latency threshold; and
- program instructions to push data into a target database, wherein latency is dynamically balanced with data consistency, based on testing an algorithm from a set of algorithms, recording statistics that the algorithm provides about a rate of replication, determining the algorithm provides a best rate of replication, and using the algorithm to move the data into the target database, wherein the algorithm is retested if latency remains above the latency threshold.

16. The computer system of claim 15, further comprising:
- in response to determining that the requested replication crossed the latency threshold, program instructions, stored on the computer readable storage media for execution by at least one of the one or more processors, to determine that the requested replication is permitted to make choices in regard to a strategy to use, based on predictions of future content of a transaction, wherein the requested replication adjusts the strategy as necessary when predictions are inaccurate.

17. The computer system of claim 15, wherein program instructions to move the data into the target database comprise:
- program instructions to move the data into the target database, based on providing a scoring function for an algorithm that indicates a benefit of using the algorithm, based on a set of statistics about a source workload.

18. The computer system of claim 15, wherein program instructions to wherein program instructions to move the data into the target database comprise:
- program instructions to move the data into the target database, based on the latency threshold, wherein the target database is an analytics database and analytics for the target database are redirected back to a source database.

19. The computer system of claim 15, further comprising:
in response to determining that the requested replication crossed the latency threshold, program instructions, stored on the computer readable storage media for execution by at least one of the one or more processors, to use algorithms that create an allowed type of inconsistency.

20. The computer system of claim 15, wherein the set of strategies include source side transactions are committed out of order; source side operations are applied out of order, although commit points are maintained; separate tables are applied by different database connections with some level of coordination between the database connections to keep the target database consistent between all tables; and source side transactions are applied as transactions on the target database.

* * * * *